(12) United States Patent
Kim

(10) Patent No.: US 7,420,581 B2
(45) Date of Patent: Sep. 2, 2008

(54) METHOD AND APPARATUS FOR PRINTING ON A LABEL SIDE OF A DISC MEDIUM

(75) Inventor: Hyeong Cheol Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 11/452,219

(22) Filed: Jun. 14, 2006

(65) Prior Publication Data

US 2006/0290985 A1 Dec. 28, 2006

(30) Foreign Application Priority Data

Jun. 14, 2005 (KR) .................. 10-2005-0051157

(51) Int. Cl.
*B41J 2/435* (2006.01)
(52) U.S. Cl. .................................... 347/224
(58) Field of Classification Search ......... 347/224–225; 369/44.27, 44.29, 100, 108
See application file for complete search history.

(56) References Cited

U.S. PATENT DOCUMENTS

| 6,862,033 | B2* | 3/2005 | McClellan ............ 347/224 |
| 2004/0062179 | A1* | 4/2004 | Tsurumi et al. .......... 369/108 |
| 2006/0087949 | A1* | 4/2006 | Lambert et al. .......... 369/100 |

* cited by examiner

*Primary Examiner*—Hai C Pham
(74) *Attorney, Agent, or Firm*—Birch, Stewart, Kolasch & Birch, LLP

(57) ABSTRACT

A method for printing an image on a disc medium, which includes determining which section of a non-image inner section or a non-image outer section requires a longer processing time on a label side of the disc medium, and printing the image starting from an outermost circumference of a print area if the non-image inner section requires the longer processing time.

27 Claims, 7 Drawing Sheets

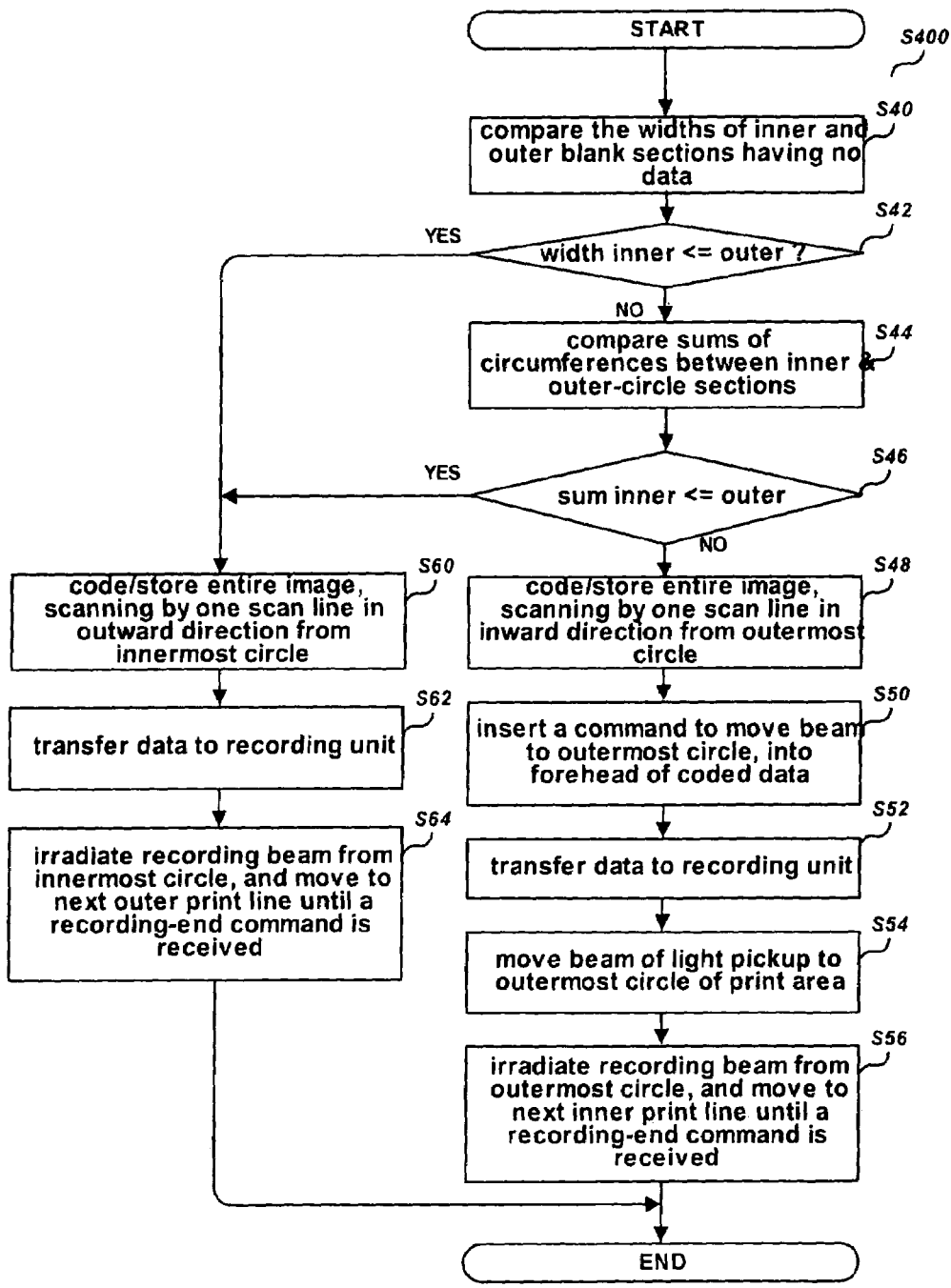

METHOD AND APPARATUS FOR PRINTING ON A LABEL SIDE OF A DISC MEDIUM

This application claims priority to Korean application No. 10-2005-0151157 filed in Korea on Jun. 14, 2005, the entire contents of which is incorporated by reference in its entirety.

BACKGROUND OF THE INVENTION

1. Field of the Invention

The present invention relates to a method and apparatus for printing an image or the like on a label side of a disc medium, and more particularly to printing the image starting from an outermost circumference of a print area if the non-image inner section requires a longer processing time.

2. Description of the Related Art

Current digital technology allow users to store their favorite video/audio contents on a disc medium, and to view/listen to the stored video/audio contents using media players. In addition, the disc medium can store a large amount of contents.

Users also place stickers or labels on a case holding a respective disc medium to identify the various information stored on the medium. However, when the sticker is attached on the case of the disc medium, the user cannot identify information stored on the disc medium when the disc medium is separated from the case. Also, when the sticker is attached to the label side of the disc medium, the outline portion of the sticker may become dirty due to an adhesive agent, or the sticker may be separated from the label side as time passes. The sticker may also become jammed in a corresponding disc drive.

Accordingly, a method of printing or recording a label directly on a label side of the disc medium has been provided. That is, the user may print or record a desired image or letters on the label side of the disc by irradiating a beam directly onto a coating surface. This method is called a "LightScribe" process.

In more detail, as shown in FIG. 1A, a LightScribe disc medium includes a control feature zone 2 next to a clamping zone 1 on a label side of the disc medium. The disc also includes a label zone and center hole. As shown in FIG. 1B, the control feature zone 2 includes a speed control feature band 2a, a control feature outer ring 2b, and a mirror region 2c. In addition, in one example generally 400 spokes are marked in the speed control feature band 2a, and a rectangular or sawteeth-shape pattern is formed in the control feature outer ring 2 b, thereby partitioning the disc medium into an index mark area, a first media ID field area, a first sawteeth wave area, a second media ID field area, a second sawteeth wave area, and a third media ID field area, as shown in FIG. 1C.

In addition, the pattern formed in the control feature zone 2 is detected by an encoder, which is located at a position corresponding to an inner circumference of a disc in a recording apparatus. When a disc medium as shown in FIG. 1A rotates, the rotation speed of the disc can be measured based on the period of a rectangular pulse detected from the spokes detected by the encoder. Therefore, input data is recorded or printed on the label side in synchronization with an end point 2d of the index mark.

Further, it is necessary to exactly identify radial positions (hereinafter, the term "position" represents a radial position if another definition is not included) on the disc to print a graphic image or letters on the label side of the disc medium. However, information formed in the control feature zone 2 does not include information about the radial positions. That is, it is necessary to exactly identify each position on the disc to record the graphic image or letters desired by the user on the label side without error, but it is impossible to identify a current position.

Therefore, as shown in FIG. 2, the related art recording apparatus moves the recording beam to sequentially pass from an innermost circle 3a of the print area along the print lines (print circles) with a predetermined recording speed (e.g., an X/4 speed) to print or record the image. When there is no image in the outward portion of a current print line, the LightScribe operation is stopped.

However, the related recording apparatus always starts the printing operation from the innermost circle 3a regardless of whether or not there is an image to be printed therein, and consecutively moves in an outward direction by one print circle at a time, while passing along each print line at a predetermined recording speed, which results in an extended printing operation.

SUMMARY OF THE INVENTION

Accordingly, one object of the present invention is to address the above-noted and other problems.

Another object of the present invention is to provide a method and apparatus that prints an image, etc. on the label side of a disc medium within a reduced time period.

To achieve these and other advantages and in accordance with the purpose of the present invention, as embodied and broadly described herein, the present invention provides in one aspect, a method for printing an image on a disc medium, which includes determining which section of a non-image inner section or a non-image outer section requires a longer processing time on a label side of the disc medium, and printing the image starting from an outermost circumference of a print area if the non-image inner section requires the longer processing time.

In another aspect, the present invention provides an apparatus for printing an image on a disc medium, which includes a controller configured to determine which section of a non-image inner section or a non-image outer section requires a longer processing time on a label side of the disc medium, and a printer configured to print the image starting from an outermost circumference of a print area if the non-image inner section requires the longer processing time.

In yet another aspect, the present invention provides a computer program product embodied on at least one computer readable medium and configured to execute computer instructions for printing an image on a disc medium. The computer program product includes a first computer code configured to determine which section of a no-image inner section or a no-image outer section requires a longer processing time on a label side of the disc medium, and a second computer code configured to control a printer to print the image starting from an outermost circumference of a print area if the no-image inner section requires the longer processing time.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more apparent from the following detailed description taken in conjunction with the accompanying drawings, wherein:

FIG. 4 is a flowchart illustrating a LightScribe method in accordance with an embodiment of the present invention;

DETAILED DESCRIPTION OF PREFFERRED EMBODIMENTS

Hereinafter, a preferred embodiment of the present invention will be described with reference to the accompanying drawings.

Figure 1A:
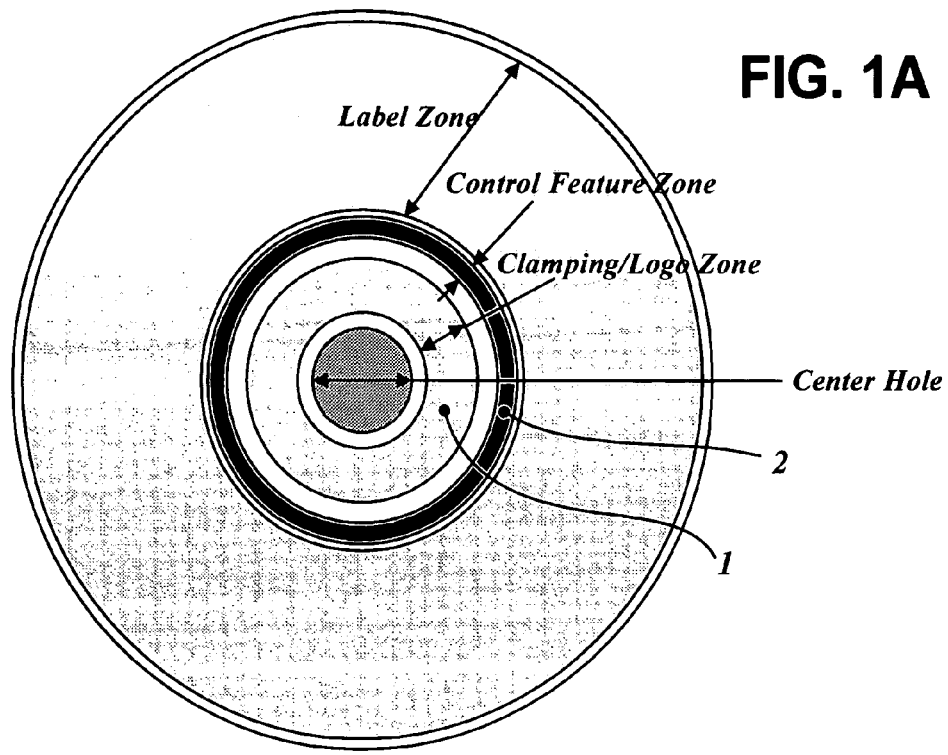
FIG. 1A is an overview of a label side of a disc medium supporting the LightScribe process.
Figure 1B:
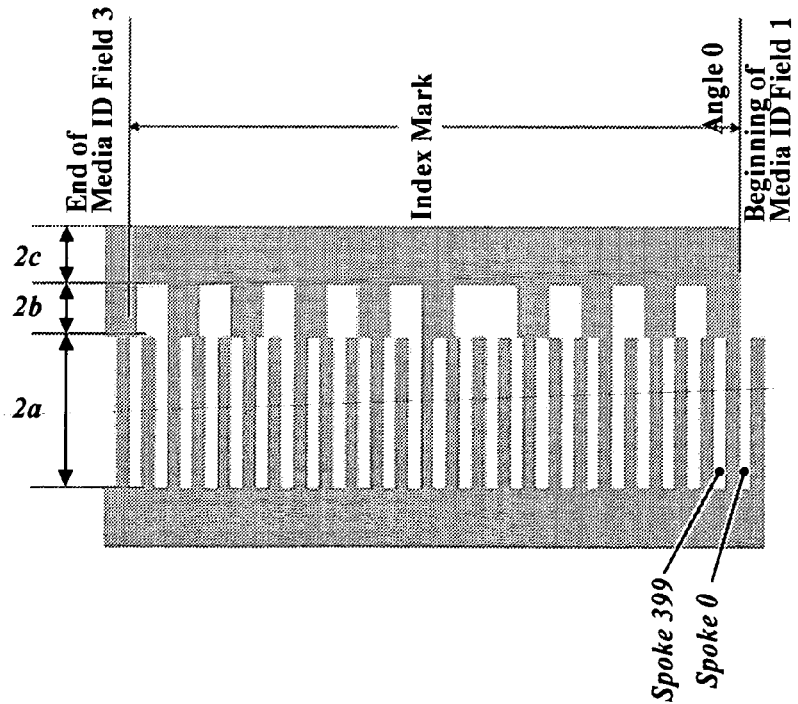
FIG. 1B is an overview showing a part of a pattern of a control feature zone shown in FIG. 1A.
Figure 1C:
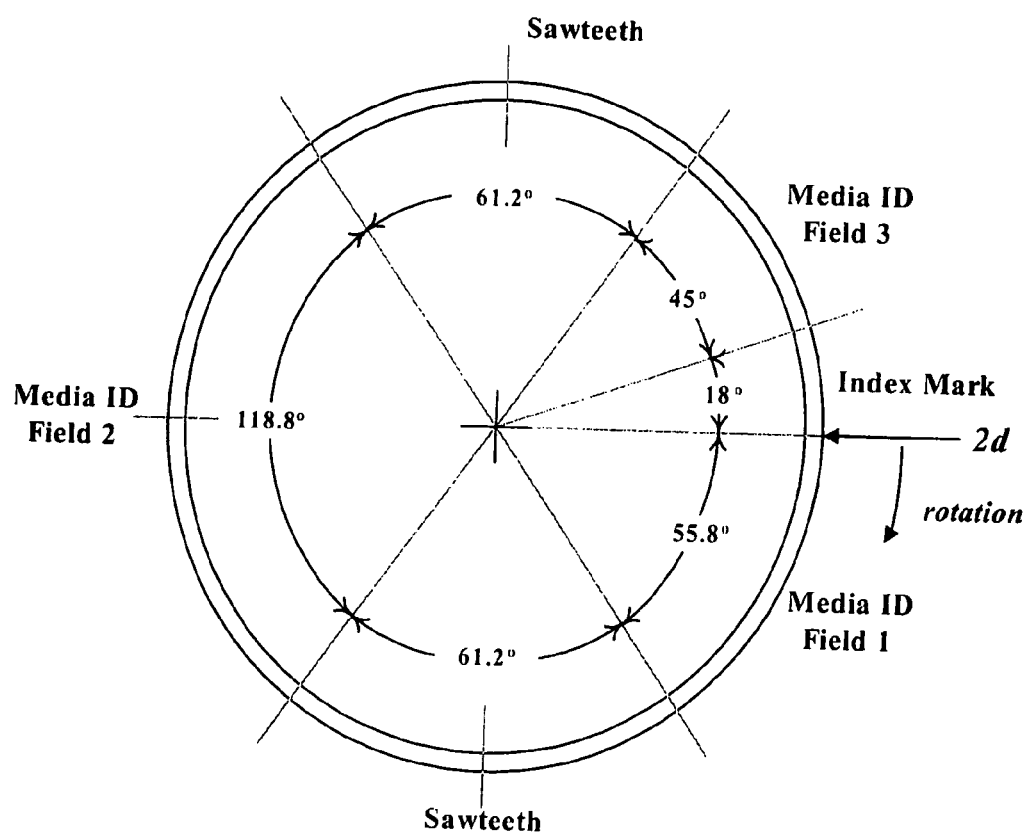
FIG. 1C is an overview showing partitioned areas in a label side of a disc medium supporting the LightScribe process.
Figure 2:
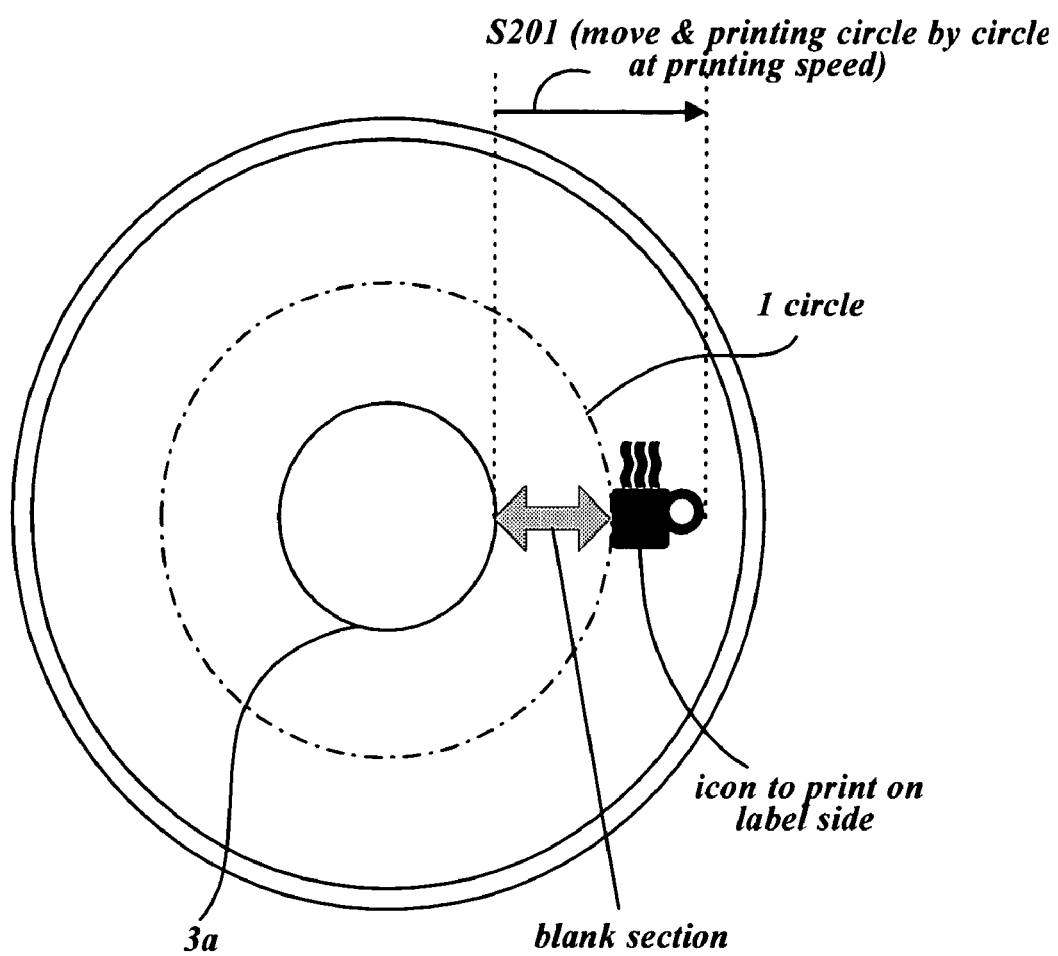
FIG. 2 is a overview illustrating a related art method for printing an image or the like using the LightScribe process.
Figure 3:
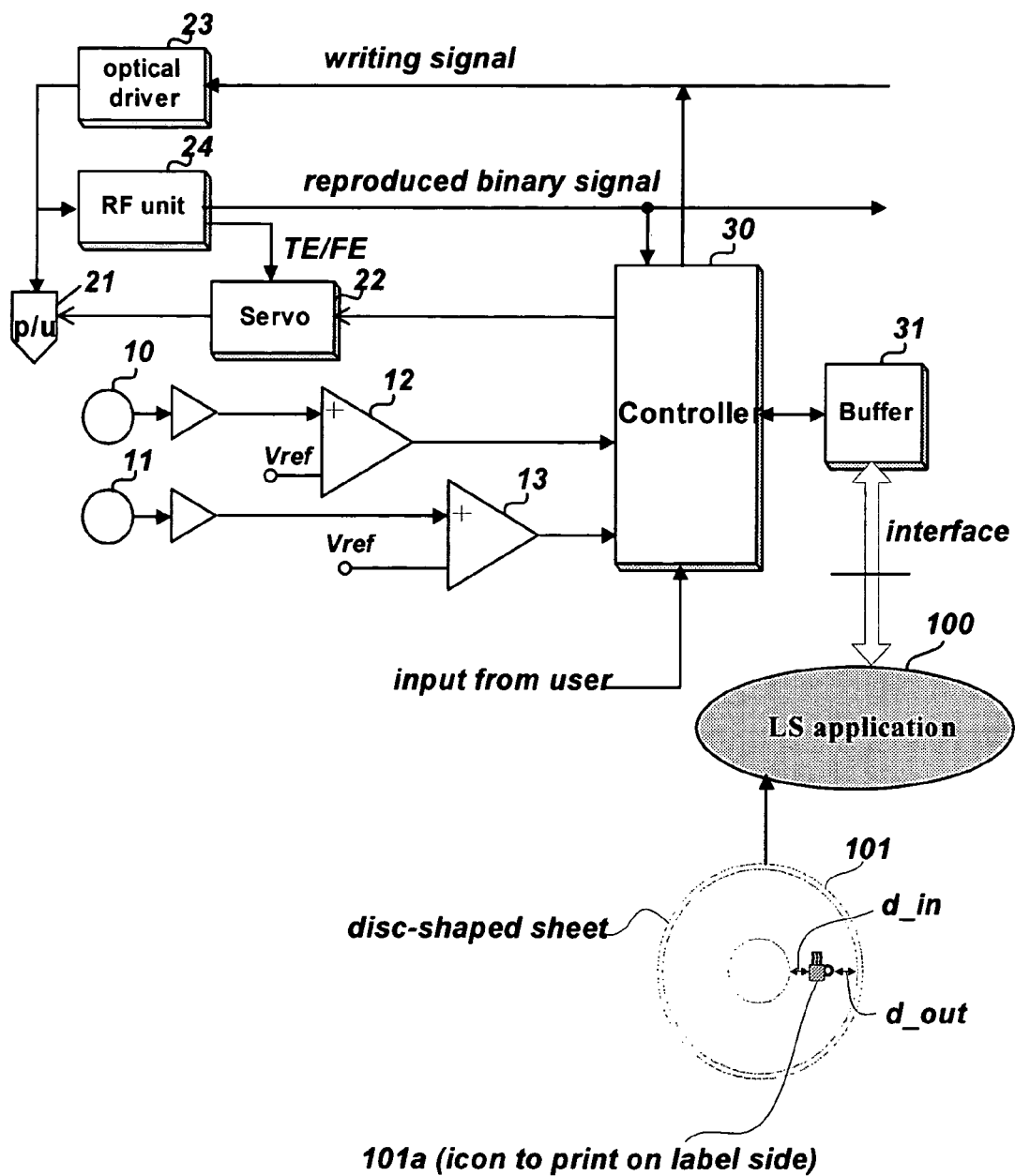
FIG. 3 is a block diagram illustrating a part of a disc recording apparatus that prints an image on the label side of a disc medium in accordance with an embodiment of the present invention.

FIG. 3 is a block diagram illustrating a part of a disc recording apparatus capable of printing on the label side of a disc medium in accordance with an embodiment of the present invention. That is, FIG. 3 shows only the components relating to the LightScribe process in a disc recording apparatus, and omits the general components relating to recording and reproduction of data. Also, a description of the well-known general operation of the disc recording apparatus is omitted for brevity purposes.

Referring to FIG. 3, the disc recoding apparatus includes a spoke light sensor 11, a ring light sensor 10, slicers 12 and 13, a optical drive unit 23, a optical pickup 21, an RF unit 24, a servo unit 22, a controller 30, a buffer 31, and a LightScribe (LS) application 100. The spoke light sensor 11 detects a beam reflected from a speed control feature zone of a disc medium, which supports the LightScribe process, and the ring light sensor 10 detects a beam reflected from a pattern formed in a control feature outer ring.

The slicers 12 and 13 compare electric signals, which have been detected from the light sensors 10 and 11 and which have then been pre-amplified, respectively, with a reference level "Vref," to convert the electric signals into square waves. The slicers 12 and 13 then output the square waves. Further, the optical drive unit 23 outputs a light beam driving signal according to an input recording signal. In addition, the optical pickup 21 irradiates a light beam corresponding to the light beam driving signal to the disc medium, and converts the reflected light of a beam for recording or a beam for reading into an electrical RF signal.

The RF unit 24 outputs a binarized signal as well as focusing error/tracking error (FE/TE) signals from the electrical RF signal. Further, the servo unit 22 controls an actuator of the optical pickup 21 to move an objective lens included within the pickup 21, a slide motor to move the optical pickup 21 and a spindle motor to rotate the disc according to a servo error signal or control signal. Also, the controller 30 judges the position of a beam based on the binarized signal output from the RF unit 24, and performs a LightScribe operation based on the square waves. The buffer 31 exchanges data and command/response with a host. In addition, the LightScribe (LS) application 100 converts an image, etc. provided from the user into data of a recording format, which is executed in the host.

Turning next to FIG. 4, which is a flowchart illustrating a LightScribe method in accordance with an embodiment of the present invention. Hereinafter, the LightScribe operation performed by the recording apparatus shown in FIG. 3, will be described together with the flowchart shown in FIG. 4.

First, the LS application 100 formalizes an image 101a, which is provided or selected by the user, into a disc-shaped sheet. Then, a direction along which a disc-shaped electronic sheet 101 including the image 101a is to be converted into a bit stream for print for LightScribe is determined. To this end, the LS application 100 measures a distance "d_in" between an innermost circle of a LightScribe print area and an innermost circle of the image 101a to be printed (the innermost circle of the image, which is most closely adjacent to the innermost circle of the print area, if there are plural images) in the disc-shaped sheet 101.

Also, the LS application 100 measures a distance "d_out" between an outermost circle of the print area and an outermost circle of the image 101a to be printed (the outermost circle of the image, which is most closely adjacent to the outermost circle of the print area, if there are plural images) in the disc-shaped sheet 101. That is, the LS application 100 detects the width of an inner-circle section (hereinafter, referred to as "non-image inner circle section") in which the LightScribe operation progresses without an image, and the width of an outer-circle section (hereinafter, referred to as "non-image outer circle section") in which the LightScribe operation progresses without an image.

Then, as shown in FIG. 4, the LS application 100 compares the two measured widths "d_in" and "d_out" in step 40. When the width "d_in" of the non-image inner circle section is equal to or narrower than the width "d_out" of the non-image outer circle section (Yes in step 42), the LS application 100 performs a bit-stream coding with respect to the input sheet 101, stating from the innermost circle of the print area (step 60).

Figure 5A:
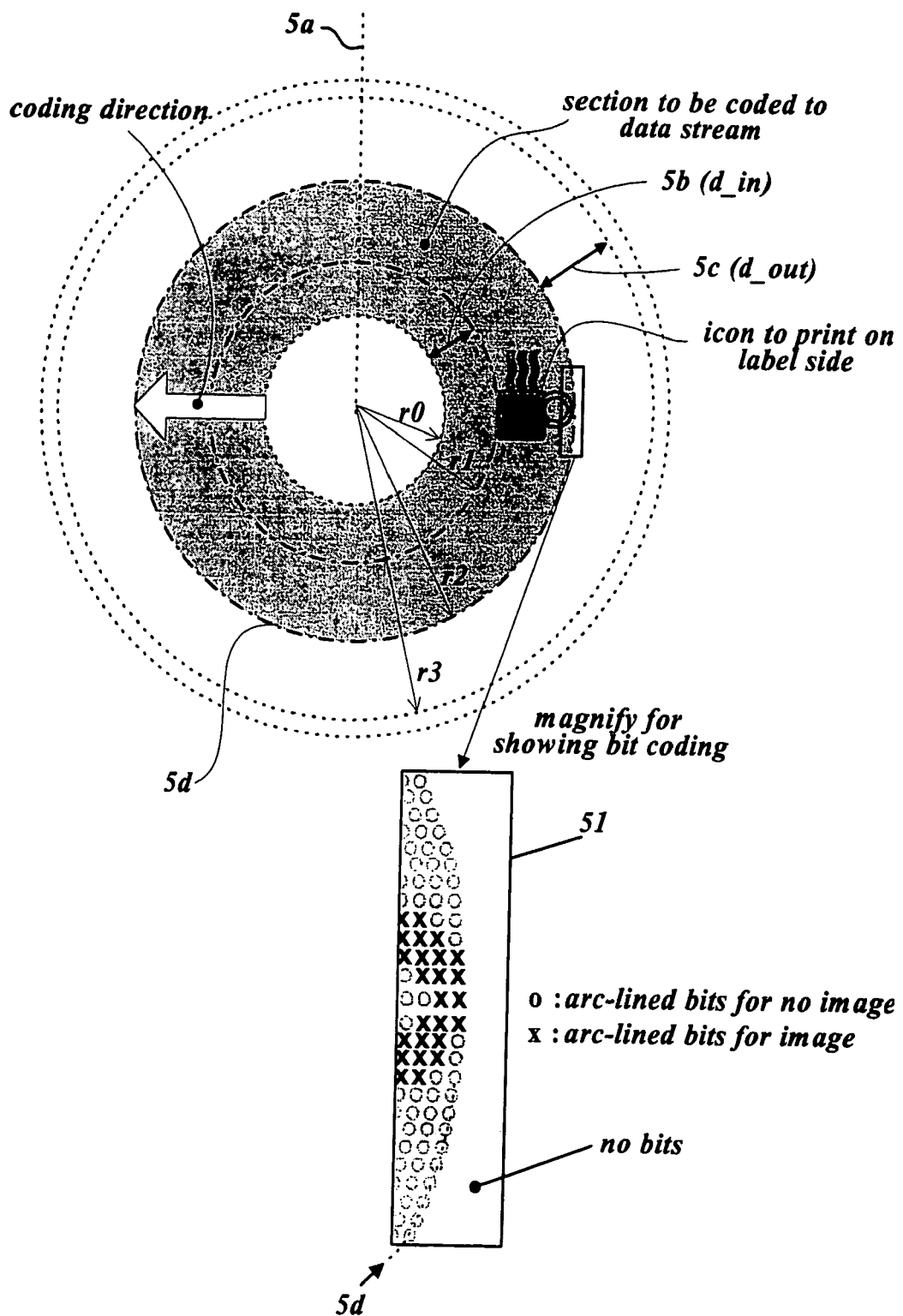
FIG. 5A is a overview illustrating a method for coding a disc-shaped sheet including an image in an outward direction from the innermost circle in accordance with an embodiment of the present invention.

For example, FIG. 5A is an overview illustrating a coding method based on step 60. Referring to FIG. 5A, based on a base line (for example, based on an upper-direction perpendicular line 5a of a sheet including an image to print), the LS application 100 generates a bit stream by setting an image portion as bit "1" and setting a non-image portion as bit "0" (or in a reverse scheme thereof) in each virtual scan line (that is, on each scan circle that corresponds to each print lineor print circle, having positions equal to those of the label side of an actual disc).

Then, the LS application 100 stores the generated bit stream in a storage unit, for example, in a hard disc. Because the scan lines have different circumferential lengths, different amounts of data are allocated to different scan lines. When "K" bytes per second are processed at a recording speed of "v0", the number "fn(Nc)" of bits allocated to each scan line "Nc" by the LS application 100 is expressed as the following equation (1):

$$fn(Nc) = 8K \cdot 2\pi(Nc \cdot Lw + r0)/v0 \text{(bits)} \quad (1)$$

Here, "r0" represents the radius of the innermost circle of a print area, and "v0" represents a recording speed for performing the LightScribe process with respect to a disc medium. Also, "Lw" represents the width of a scan line (which corresponds to a width of one or a few track(s) in the recording layer of the disc medium), and "Nc×Lw+r0" represents the value of the radius to the position of a scan line "Nc."

That is, the LS application 100 allocates "fn(Nc)" bits to every print line "Nc" based on equation (1), starting from the innermost print line. In this instance, the LS application 100 generates data 51 (see FIG. 5A) by allocating "1" to each bit corresponding to a part of the image and allocating "0" to each bit corresponding to a non-image part (or in the reverse scheme thereof). Further, the LS application 100 does not further generate data with respect to an outer-circle section 5c in which an image does not exist. That is, a message representing a recording-end command is added to the final part of the generated data.

Meanwhile, when the width "d_in" of the non-image inner circle section is wider than the width "d_out" of the non-image outer circle section (No in step S40), the LS application 100 compares the total lengths of scan lines to be coded between the non-image inner circle section and the non-image outer circle section (step 44). When the total length of scan lines for a first section is larger than that for a second section, the first section requires a longer passing time than the second section, because data for every print lines must be recorded at the same speed (actually, the data has a value of no image, so the recording power is not incident).

Further, when the radiuses of the innermost circle and the outermost circle of the image 101a in the disc-shaped sheet 101 are expressed as "r1" and "r2," respectively, and the radius of the outermost circle of a print area is expressed as "r3," the LS application 100 calculates and compares $$\sum_{r0}^{r1} 2\pi \cdot r \text{ and } \sum_{r2}^{r3} 2\pi \cdot r$$

with each other. When it is determined as a result of the comparison that the total length of scan lines for the non-image inner circle section is equal to or shorter than that for the non-image outer circle section (Yes in step S46), the LS application 100 generates data 51, starting from the innermost circle of the print area as described with reference to FIG. 5A (step 60). In addition, instead of the total lengths of scan lines for the non-image inner/outer circle sections, the total dimensions of the non-image inner/outer circle sections (that is, "$\pi \times r1^2 - \pi \times r0^2$" and "$\pi \times r3^2 - \pi \times r2^2$") may be measured and compared with each other.

Figure 5B:
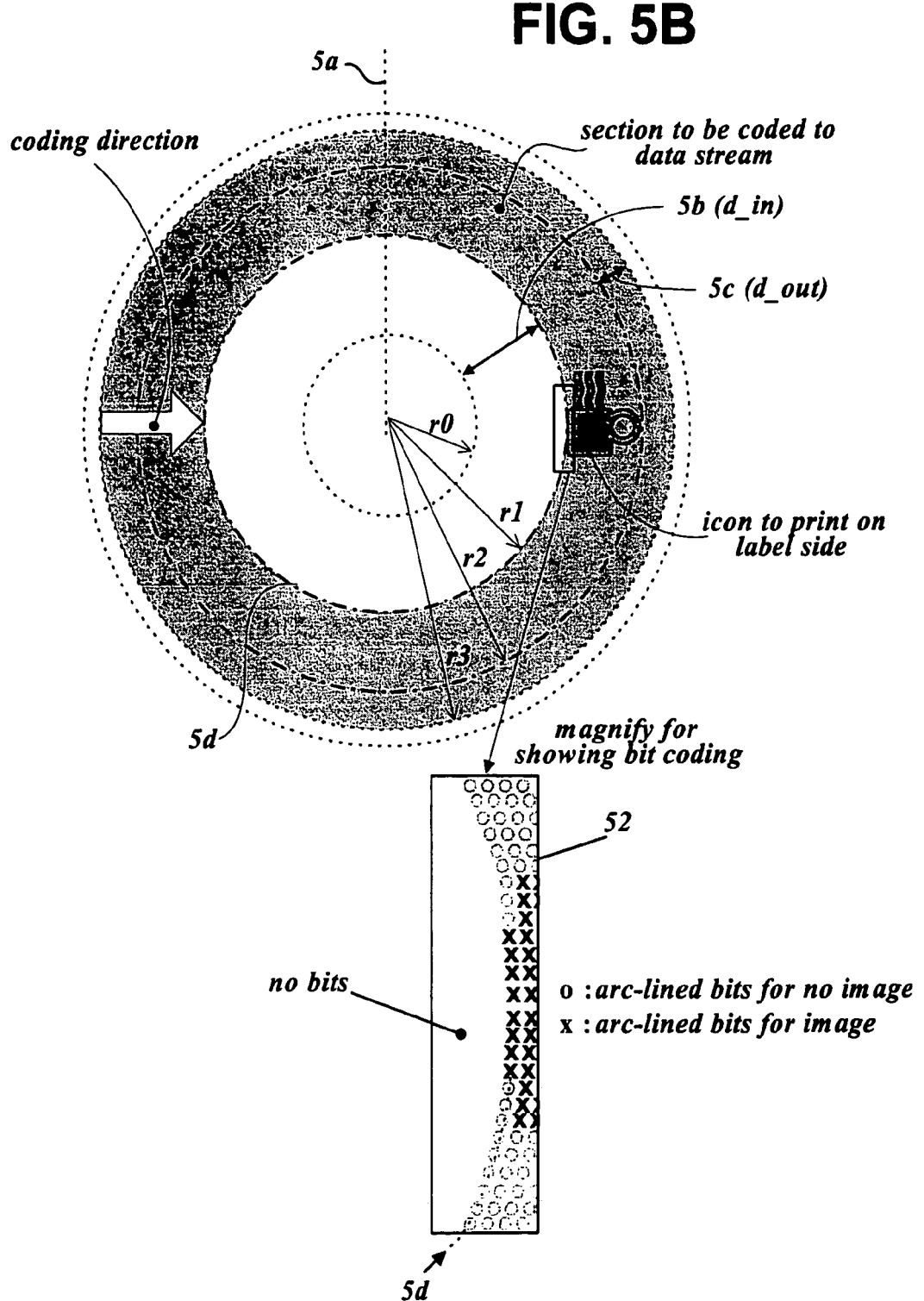
FIG. 5B is a overview illustrating a method for coding a disc-shaped sheet including an image in an inward direction from the outermost circle in accordance with an embodiment of the present invention.

When the total length of scan lines for the non-image inner circle section is longer than the total length of scan lines for the non-image outer circle section (step 46), the LS application 100 generates data 52 by allocating bit values to each scan line "Nc" that is, by allocating "1" to each bit corresponding to a part of the image and allocating "0" to each bit corresponding to a non-image part, or in the reverse scheme thereof) based on equation (1), starting the scan process from the outermost circle of the print area to the innermost circle thereof as shown in FIG. 5B (step 48). In this instance, the LS application 100 does not further generate data with respect to the inner-circle section 5b in which an image does not exist. That is, a message representing a recording-end command is added to the final part of the generated data 52.

When the coding is performed while the sheet 101 is scanned from the outer-circle side to the inner-circle side as illustrated in FIG. 5B, the LS application 100 generates a jump command for moving the optical pickup 21 to the outermost circle of the print area, and inserts the jump command into the forehead of the previously-generated data 52 (step 50).

As described above, the data 52 for the LightScribe process, which was generated in the schemes of FIGS. 5A and 5B and stored in a storage unit, is read from the storage unit sequentially according to a stored sequence, and provided to the controller 30 through the buffer 31 (steps 52 and 62). Then, the controller 30 reads and processes the information or data buffered in the buffer 31. Further, when there is a jump command for moving the optical pickup 22 to the outermost circle, the controller 30 controls the servo unit 22 so as to move the optical pickup 21 to the outermost circle "r3" (step 54). When the optical pickup 21 is not moved to the outermost circle, the beam of the optical pickup 21 is located at the innermost circle "r0" by an initial operation for the LightScribe process.

Then, the rotation speed of the disc is controlled through the servo unit 22 so as to enable the beam to have a predetermined linear velocity "v0" at the current position. In addition, the rotation speed of the disc can be maintained as a desired velocity based on the number of pulses per unit time detected by the spoke light sensor 11. Then, the controller 30 monitors whether an index mark is detected from a signal detected from the ring light sensor 10. Also, when detecting an index mark, the controller 30 sequentially reads the data for the LightScribe process received in the buffer 31 and applies a recording signal corresponding to each bit value to the optical drive unit 23 in synchronization with the end point of the detected index mark, thereby printing an image in one print line. If the data represents no-image exists, the recording beam is not irradiated. That is, a predetermined portion of the print line corresponding to the no-image data is skipped. After all of the data for a current print line (which can be understood from equation 1) has been read from the buffer 31 and is processed, the controller 30 shifts the beam of the optical pickup 21 to the next print line.

Further, when the printing operation starts from the outermost circle, the next print line is a print line located inward of and next to the current line. On the contrary, when the printing operation starts from the innermost circle, the next print line is a print line located outward of and next to the current line. In addition, after the beam is shifted by one print line, the controller 30 applies a recording signal corresponding to the next data buffered in the buffer 31 to the optical drive unit 23, in synchronization with the end point of an index mark obtained from a pattern detected by the ring light sensor 10 (steps 56 and 64). In addition, the LightScribe operation is continuously performed until a recording-end command message is received.

Thus, according to the embodiment of the present invention described above, the LS application 100 determines a direction along which the disc-shaped electronic sheet 101 including the image 101a is converted into a bit stream, by detecting and comparing the widths of the non-image inner circle section and the non-image outer circle section with each other. In addition, in accordance with another embodiment of the present invention, the LS application 100 first calculates the entire circumference (or the dimensions) of scan lines for the non-image inner circle section and the entire circumference (or the dimensions) of scan lines for the non-image outer circle section, and then directly determines whether coding has been performed in an outward direction from the innermost circle or in an inward direction from the outermost circle, based on the magnitudes of the two calculated values.

In accordance with an embodiment of the present invention described above, the LightScribe operation is performed from one of the non-image inner and outer circle sections requiring a shorter recording time, to the area having an image. Therefore, as compared with the related art method, the present invention reduces the printing time period when a processing time period for the non-image inner circle section is longer than that for the non-image outer circle section.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for printing an image on a disc medium, the method comprising:
    determining which section of a non-image inner section or a non-image outer section requires a longer processing time on a label side of the disc medium; and
    printing the image starting from an outermost circumference of a print area if the non-image inner section requires the longer processing time.

2. The method as claimed in claim 1, wherein the printing step starts from an innermost circumference of the print area if the non-image outer section requires the longer processing time.

3. The method as claimed in claim 1, wherein the printing step comprises:
    irradiating a recording beam corresponding to input data on the label side, while moving the recording beam in an outward direction from an innermost circumference or in an inward direction from the outermost circumference of the label side.

4. The method as claimed in claim 3, wherein the input data correspond to print data coded in a scan circle unit in the inward direction from an outermost circumference of a sheet having a shape identical to a shape of the label side of the disc medium and including the image, when the non-image inner section requires the longer processing time.

5. The method as claimed in claim 4, wherein the printing step includes moving the recording beam to the outermost circumference of the print area based on a movement command received before the print data.

6. The method as claimed in claim 3, wherein the processing time represents a time period required when the recording beam passes along a length corresponding to a sum of lengths of print circles included in each of the non-image inner section and the non-image outer section at a predetermined recording speed.

7. The method as claimed in claim 1, wherein the printing step includes stopping the printing after the image has been completely printed.

8. The method as claimed in claim 1, wherein the determining step determines which section of the non-image inner section or the non-image outer section requires the longer processing time by comparing either dimensions of the non-image inner section and the non-image outer section or sums of circumferences of print circles included in the non-image inner section and the non-image outer section.

9. The method as claimed in claim 1, wherein the determining step includes:
    comparing a width of the non-image inner section with that of the non-image outer section; and
    determining the processing time for the non-image inner section is shorter than that for the non-image outer section, when the width of the non-image inner section is equal to or narrower than that of the non-image outer section.

10. An apparatus for printing an image on a disc medium, the apparatus comprising:
    a controller configured to determine which section of a non-image inner section or a non-image outer section requires a longer processing time on a label side of the disc medium; and
    a printer configured to print the image starting from an outermost circumference of a print area if the non-image inner section requires the longer processing time.

11. The apparatus as claimed in claim 10, wherein the controller controls the printer to start from an innermost circumference of the print area if the non-image outer section requires the longer processing time.

12. The apparatus as claimed in claim 10, wherein the controller controls the printer to irradiate a recording beam corresponding to input data on the label side, while moving the recording beam in an outward direction from an innermost circumference or in an inward direction from the outermost circumference of the label side.

13. The apparatus as claimed in claim 12, wherein the input data correspond to print data coded in a scan circle unit in the inward direction from an outermost circumference of a sheet having a shape identical to a shape of the label side of the disc medium and including the image, when the no-image inner section requires the longer processing time.

14. The apparatus as claimed in claim 13, wherein the controller controls the printer to move the recording beam to the outermost circumference of the print area based on a movement command received before the print data.

15. The apparatus as claimed in claim 12, wherein the processing time represents a time period required when the recording beam passes along a length corresponding to a sum of lengths of print circles included in each of the no-image inner section and the no-image outer section at a predetermined recording speed.

16. The apparatus as claimed in claim 10, wherein the controller controls the printer to stop printing after the image has been completely printed.

17. The apparatus as claimed in claim 10, wherein the controller determines which section of the non-image inner section or the non-image outer section requires a longer processing time by comparing either dimensions of the non-image inner section and the non-image outer section or sums of circumferences of print circles included in the non-image inner section and the non-image outer section.

18. The apparatus as claimed in claim 10, wherein the controller compares a width of the non-image inner section with that of the no-image outer section, and determines the processing time for the non-image inner section is shorter than that for the non-image outer section, when the width of the non-image inner section is equal to or narrower than that of the non-image outer section.

19. A computer program product embodied on at least one computer readable medium and configured to execute computer instructions for printing an image on a disc medium, the computer program product comprising:
  a first computer code configured to determine which section of a no-image inner section or a no-image outer section requires a longer processing time on a label side of the disc medium; and
  a second computer code configured to control a printer to print the image starting from an outermost circumference of a print area if the no-image inner section requires the longer processing time.

20. The computer program product as claimed in claim 19, wherein the second computer code controls the printer to start from an innermost circumference of the print area if the no-image outer section requires the longer processing time.

21. The computer program product as claimed in claim 19, wherein the second computer code controls the printer to irradiate a recording beam corresponding to input data on the label side, while moving the recording beam in an outward direction from an innermost circumference or in an inward direction from the outermost circumference of the label side.

22. The computer program product as claimed in claim 21, wherein the input data correspond to print data coded in a scan circle unit in the inward direction from an outermost circumference of a sheet having a shape identical to a shape of the label side of the disc medium and including the image, when the no-image inner section requires the longer processing time.

23. The computer program product as claimed in claim 22, wherein the second computer code controls the printer to move the recording beam to the outermost circumference of the print area based on a movement command received before the print data.

24. The computer program product as claimed in claim 21, wherein the processing time represents a time period required when the recording beam passes along a length corresponding to a sum of lengths of print circles included in each of the non-image inner section and the non-image outer section at a predetermined recording speed.

25. The computer program product as claimed in claim 19, wherein the second computer code controls the printer to stop printing after the image has been completely printed.

26. The computer program product as claimed in claim 19, wherein the first computer code determines which section of the non-image inner section or the non-image outer section requires the longer processing time by comparing either dimensions of the non-image inner section and the non-image outer section or sums of circumferences of print circles included in the non-image inner section and the non-image outer section.

27. The computer program product as claimed in claim 19, wherein the first computer code includes:
  a third computer code to compare a width of the non-image inner section with that of the non-image outer section; and
  a fourth computer code to determine the processing time for the non-image inner section is shorter than that for the non-image outer section, when the width of the non-image inner section is equal to or narrower than that of the non-image outer section.

* * * * *